United States Patent
Ragil et al.

(10) Patent No.: US 6,290,751 B1
(45) Date of Patent: Sep. 18, 2001

(54) METHOD AND PLANT FOR PROCESSING A NATURAL GAS WITH HIGH $N_2$ CONTENTS AND RECYCLING

(75) Inventors: Karine Ragil; Michel Thomas; Sophie Jullian, all of Rueil-Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/362,724

(22) Filed: Jul. 29, 1999

(30) Foreign Application Priority Data

Jul. 31, 1998 (FR) .................................................. 98 09822

(51) Int. Cl.⁷ ............................................... B01D 53/047
(52) U.S. Cl. ............................ 95/101; 95/102; 95/105; 95/130; 95/143; 96/130; 96/144
(58) Field of Search ...................... 95/96–98, 100–105, 95/130, 143–148; 96/130, 133, 143, 144

(56) References Cited

U.S. PATENT DOCUMENTS

| | | | |
|---|---|---|---|
| 2,918,140 | * 12/1959 | Brooks ...................................... | 95/98 |
| 4,477,265 | * 10/1984 | Kumar et al. ........................... | 95/96 X |
| 4,732,577 | * 3/1988 | Koizumi et al. ........................ | 95/101 |
| 4,744,803 | 5/1988 | Knaebel .................................... | 55/25 |
| 4,913,709 | * 4/1990 | Kumar ...................................... | 95/100 |
| 4,964,889 | * 10/1990 | Chao ........................................ | 95/96 |
| 4,985,052 | * 1/1991 | Haruna et al. .......................... | 95/101 |
| 5,112,590 | * 5/1992 | Krishnamurthy et al. ........... | 95/102 X |
| 5,536,300 | 7/1996 | Reinhold, III et al. ................ | 95/101 |
| 5,707,425 | * 1/1998 | D'Amico et al. ..................... | 95/103 X |
| 5,980,857 | * 11/1999 | Kapoor et al. ......................... | 95/98 X |
| 5,989,316 | * 11/1999 | Kuznicki et al. ...................... | 95/130 |
| 5,993,517 | * 11/1999 | Chen et al. .............................. | 95/98 |

FOREIGN PATENT DOCUMENTS 0302658   2/1989   (EP) .
2218923   11/1989   (GB) .

* cited by examiner

*Primary Examiner*—Robert H. Spitzer
(74) *Attorney, Agent, or Firm*—Antonelli, Terry, Stout & Kraus, LLP

(57) ABSTRACT

A method and plant to process a fluid comprising one or more compounds $G_2$ having a kinetic diameter less than or equal to that of nitrogen and one or more compounds $G_1$ having a kinetic diameter greater than or equal to that of methane. The method and plant use in combination, several adsorption and desorption stages during which a first stream $F_1$ mainly comprising compounds $G_1$, a second stream $F_2$ enriched in compounds $G_2$, a third stream $F_3$ mainly comprising compounds $G_2$ and a fourth stream $F_4$ mainly comprising compounds $G_1$ are produced. At least a fraction of stream $F_3$ is used to flush adsorption section $A_1$.

17 Claims, 2 Drawing Sheets

METHOD AND PLANT FOR PROCESSING A NATURAL GAS WITH HIGH $N_2$ CONTENTS AND RECYCLING

FIELD OF THE INVENTION

The present invention relates to a method and to a plant for processing a fluid comprising at least one or more compounds $G_1$ having a kinetic diameter greater than or equal to that of methane and at least one or more compounds $G_2$ having a kinetic diameter less than or equal to that of nitrogen, notably in order to separate them and to improve the recovery ratio of compounds $G_1$ and/or $G_2$.

The method is notably applied to remove the nitrogen contained in a natural gas mainly comprising methane.

BACKGROUND OF THE INVENTION

About 15% of the world's available natural gas reserves comprise appreciable amounts of compounds of low calorific value such as nitrogen. The presence of these compounds can be natural or result from the use of an enhanced recovery process. The presence of such compounds, notably in large amounts (with concentrations typically above 4% mol) reduces the calorific value of the gas. The characteristics of the gas are then incompatible with existing commercial transportation and distribution systems specifications since its calorific value can then be below 960 BTU/SCF which corresponds on average to nitrogen contents above 4% by moles.

Less than 10% of the gas fields containing nitrogen in large amounts (more than 4% mol) are currently developed.

Various methods allowing to remove nitrogen are known from the prior art.

It is thus possible to perform cryogenic distillation. Such a process generally leads to high investment costs.

It is also well-known to use adsorption processes for denitrogenation and a certain number of patents refer to them, based either on thermodynamic selectivities or equilibrium selectivities (U.S. Pat. Nos. 4,578,089, 5,174,796 and 5,536,300) or diffusion selectivities (U.S. Pat. Nos. 4,964,889, 4,935,580 and 2,843,219). The latter originate from the difference between the adsorption kinetics of the molecules to be separated, whereas thermodynamic selectivities originate from a difference in the adsorbed quantity at equilibrium.

These processes are characterized by considerable dead volumes since the interstitial volume (volume between the adsorbent particles) commonly represents 30% of the adsorber volume. In the case where adsorbers are used at high pressures, large amounts of the less retained compounds can lodge themselves in these dead volumes and can thus be produced, not during the production phase, but during the regeneration phase, leading to a decrease in the recovery ratio per pass of these compounds.

SUMMARY OF THE INVENTION

One of the objects of the present invention is to propose a method allowing to increase the recovery ratio per pass of the less retained species, i.e. hydrocarbons in the first section of the process and compounds of low calorific values in the second section.

It is possible to use at least part of a stream produced during the process in order to flush one of the adsorption means so as to recover the compounds that have lodged themselves in the dead volumes of the adsorbers.

Advantageously, at least a fraction of stream $F_3$ is used to flush adsorption zone $A_1$.

The object of the invention relates to a method allowing to process at least one fluid comprising one or more compounds $G_2$ having a kinetic diameter less than or equal to that of nitrogen and one or more compounds $G_1$ having a kinetic diameter greater than or equal to that of methane.

It is characterized in that it comprises in combination at least the following stages:

sending said fluid to be processed to an adsorption stage (a) after which a first stream $F_1$ mainly comprising compounds $G_1$ is obtained, said compounds $G_2$ being to mainly adsorbed in a first adsorption zone $A_1$, carrying out a desorption stage (b) in first adsorption zone $A_1$ at a pressure $P_2$ so as to produce a second stream $F_2$, said second stream $F_2$ being enriched in compounds $G_2$ in relation to said fluid to be processed, sending said second stream $F_2$ at a pressure $P_3$ to an adsorption stage (c), after which a third stream $F_3$ mainly comprising non-adsorbed compounds $G_2$ is obtained, and to a second adsorption zone $A_2$ enriched in compounds $G_1$, carrying out a desorption stage (d) by lowering the pressure value from $P_3$ to a value $P_4$ so as to recover at least a fourth stream $F_4$ mainly comprising compounds $G_1$, using at least a fraction of third stream $F_3$ from adsorption zone $A_2$ at a pressure no substantially equal to $P_3$ and mainly comprising compounds $G_2$ to flush adsorption zone $A_1$ in order to produce a stream comprising compounds $G_1$ after adsorption stage (a).

Flushing can be performed by cocurrent flow.

According to an embodiment. at least a fraction of fourth stream $F_4$ from desorption stage (d) is brought to a pressure substantially equal to pressure $P_3$ and the compressed fraction is recycled to adsorption stage (c).

The fraction of stream $F_4$ can be recycled to second stream $F_2$ prior to bringing it to a pressure $P_3$.

The fraction of stream $F_4$ can also be recycled to zone A, after bringing it to a pressure $P_3$.

According to a variant, at least a fraction of third stream $F_3$ mainly comprising non-adsorbed compounds $G_2$ is for example used to carry out a cocurrent flushing stage in the first adsorption section and to produce a stream comprising compounds $G_1$ after adsorption stage (a), after bringing the pressure of said third stream $F_3$ to a pressure required for the flushing stage.

The various adsorption and desorption stages are carried out in order to obtain a purity in compounds $G_1$ of stream $F_4$ lower than the purity in compounds $G_1$ of said stream $F_1$.

Stage (a) can be carried out at a pressure $P_1$ ranging between 0.3 and 3 MPa, preferably between 0.5 and 2.5 MPa.

The value of pressure $P_2$ and/or of pressure $P_4$ is for example lower than 0.5 MPa and it preferably ranges between 0.001 and 0.5 MPa.

The value of pressure $P_3$ can range between 0.2 and 3 MPa, preferably between 0.3 and 2 MPa.

It is possible to work at a temperature ranging between −50 and +100° C., preferably between −30 and 50° C.

The object of the invention also relates to a plant for processing a fluid comprising at least compounds $G_1$ having a kinetic diameter greater than or equal to that of methane and compounds $G_2$ having a kinetic diameter less than or equal to that of nitrogen, comprising in combination at least a first adsorption means $A_1$ and a second adsorption means $A_2$, said first means being selected for its diffusion selectivity and its capacity to retain mostly compounds $G_2$, said second means being selected for its thermodynamic selectivity and its capacity to retain mostly compounds $G_1$, delivery and extraction lines for the various streams, first adsorption means $A_1$ comprising at least one delivery line for the fluid to be processed, at least one line for discharge of a first stream $F_1$ mainly comprising compounds $G_1$, at least means allowing to extract a second stream $F_2$ enriched in compounds $G_2$ in relation to said fluid to be processed, and to send it to said second means $A_2$, said second means $A_2$ comprising at least one line for discharge of a third stream $F_3$ mainly comprising compounds $G_2$ and at least a fourth line allowing to extract a stream $F_4$ mainly comprising compounds $G_1$.

The plant is characterized in that it comprises at least means allowing to inject at least a fraction of third stream $F_3$ comprising compounds $G_2$ into first means $A_1$ so as to flush it and to produce a stream comprising compounds $G_1$, said line being provided with a device for bringing the third stream to a sufficient pressure.

The plant can comprise means allowing the pressure of stream $F_2$ to be brought from a value $P_2$ to a pressure value $P_3$.

The plant can also comprise means for recycling at least a fraction of stream $F_4$ to the inlet of the second adsorption means.

The fraction of stream $F_4$ is for example recycled upstream from the compression device intended for stream $F_2$.

The fraction of stream $F_4$ can also be recycled to second means $A_2$ after passing through a compression means.

The method and the plant can be used to remove the nitrogen present in a fluid comprising hydrocarbons.

The method and the plant according to the invention can also be used to remove the nitrogen present in a natural gas.

In relation to the methods described in the prior art, and applied more specifically to processing of a natural gas, the invention notably affords the following advantages:

it allows to work with very low hydrocarbon losses and thus to optimize their recovery ratio. Globally, the hydrocarbon recovery ratio can be above 99% mol, it allows to obtain high purities in compounds $G_1$ in streams $F_1$ and $F_4$ by optimizing the total mass of adsorbent used. The process according to the invention allows in particular a reduction in the mass of adsorbent used in second adsorption zone $A_2$ by using at least a fraction of stream $F_3$ to flush zone $A_1$, the fact of notably increasing the recovery ratios per pass of compounds $G_1$ in zone $A_1$ and $G_2$ in zone $A_2$ respectively leads to savings in the mass of adsorbent used and to a decrease in the costs associated with compression of the gases, it allows to obtain a majority of processed hydrocarbon streams (more than 50%) at a pressure close to pressure $P_1$, which allows to limit further gas recompression costs required to bring it to the pressure of the transportation and distribution networks.

BRIEF DESCRIPTION OF THE DRAWINGS

Other features and advantages of the device according to the invention will be clear from reading the description hereafter of non limitative examples, with reference to the accompanying drawings wherein.

DETAILED DESCRIPTION

Figure 1:
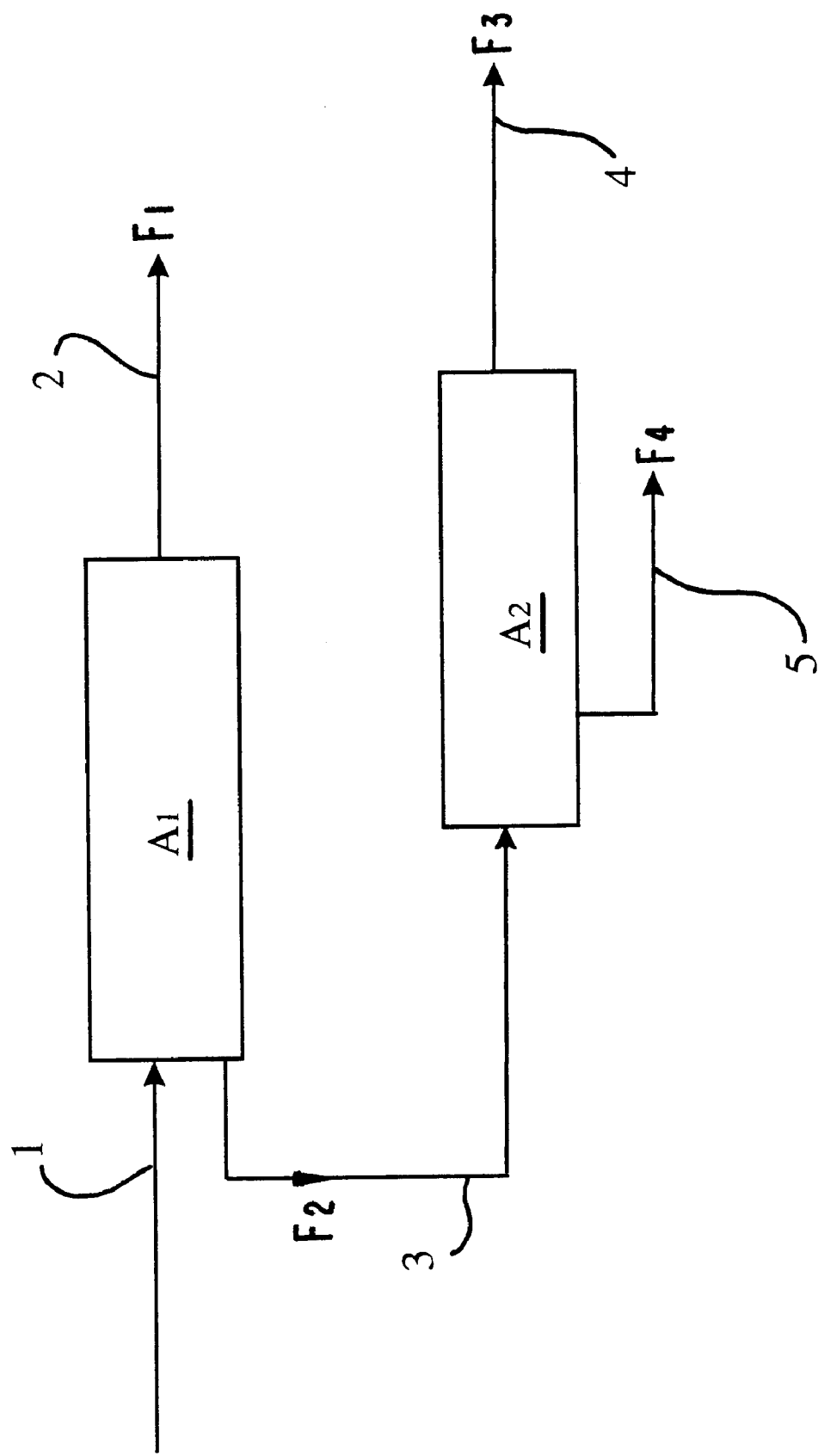
FIG. 1 is a diagram of the process according to the prior art.

FIG. 1 diagrammatically shows an example of a method according to the prior art allowing to process a fluid or feed comprising at least one or more compounds $G_1$ having a kinetic diameter greater than or equal to that of methane and at least one or more compounds $G_2$ having a kinetic diameter less than or equal to that of nitrogen.

The feed is introduced through a line 1 into an adsorption zone $A_1$.

First section $A_1$ allows to produce:

a first stream $F_1$ discharged through a line 2, mainly comprising compounds $G_1$ in relation to the initial feed introduced, and a second stream $F_2$ discharged through a line 3 and enriched in compounds $G_2$ in relation to the feed of the process. This stream results from an operation of desorption of this first section.

The adsorbent(s) of this first section $A_1$ are selected for their capacity, under specific conditions, to retain mostly compounds $G_2$ since their dynamic capacity is higher, under these operating conditions, for compounds $G_2$ than for compounds $G_1$.

Stream $F_2$ is then sent through a line 3 to a second section $A_2$.

This second section allows to produce:

a first stream $F_3$ discharged through a line 4, mainly comprising compounds $G_2$, and a second stream $F_4$ discharged through a line 5, mainly comprising compounds $G_1$.

The adsorbent(s) of this second zone have a thermodynamic or equilibrium selectivity in favour of adsorption of the compounds whose kinetic diameter is greater than or equal to that of methane, these compounds are therefore mainly retained by the adsorbent. The compounds whose kinetic diameter is less than or equal to that of nitrogen are less retained, and they form the majority of the compounds of third stream $F_3$ from this second zone.

The method according to the invention notably aims to maximize the recovery ratios per pass of compounds $G_1$ in zone $A_1$ and of compounds $G_2$ in zone $A_2$ respectively. Part or all of a stream comprising mostly compounds that have not been adsorbed in section $A_2$ is therefore notably used to flush first section $A_1$ for example.

Figure 2:
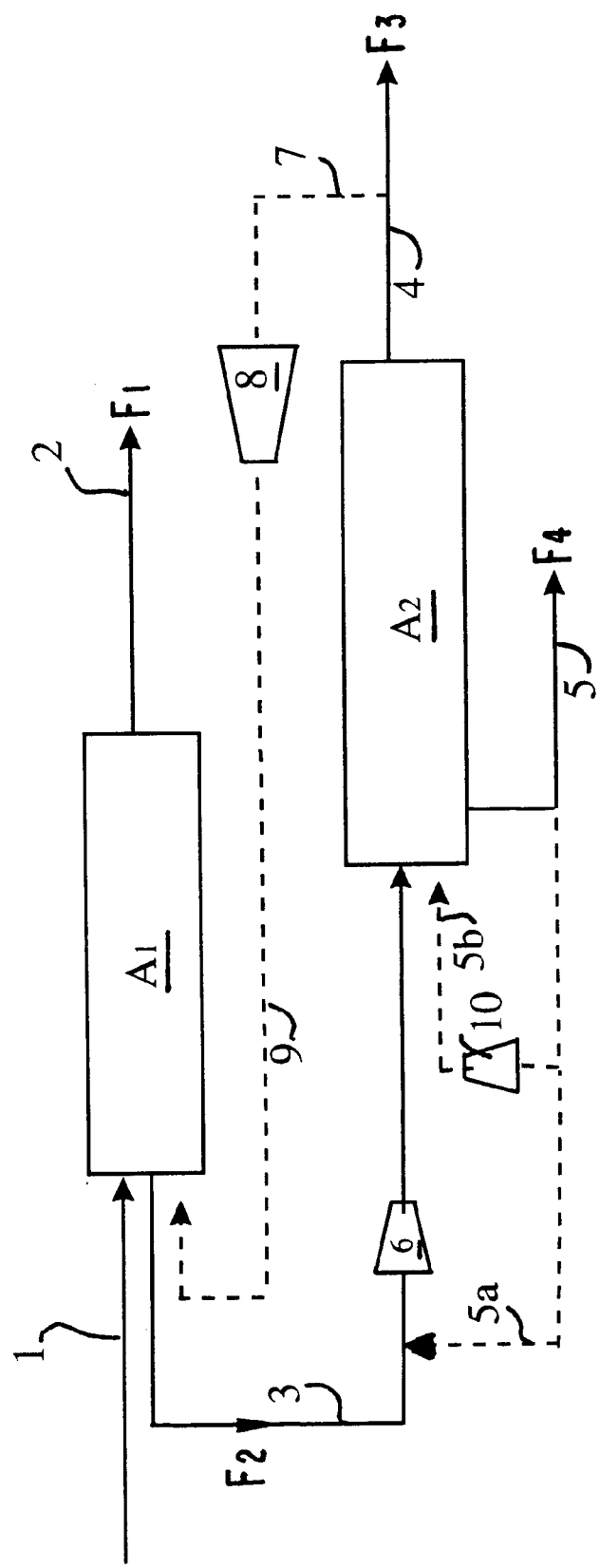
FIG. 2 diagrammatically shows the process according to the invention allowing to flush the first adsorption means by using part of stream $F_3$ produced at pressure $P_3$.

In order to illustrate the method according to the invention by way of non limitative example, FIG. 2 describes an example of a plant for processing a natural gas containing many hydrocarbons, in particular paraffin and olefinic hydrocarbons, consisting of one, two or three carbon atoms and of molecules whose kinetic diameter is less than or equal to that of nitrogen, such as water or oxygen.

A natural gas can typically contain between 0.1% and 20% mol of $C_2$ hydrocarbons, between 0.1% and 20% mol of $C_{3+}$ hydrocarbons, between 1 and 70% mol of nitrogen. The expression "compounds $G_1$" designates compounds of the feed whose kinetic diameter is greater than or equal to that of methane, hydrocarbons for example, and the expression "compounds $G_2$" designates those whose kinetic diameter is less than or equal to that of nitrogen.

Natural gas can also contain compounds whose kinetic diameter ranges between that of nitrogen and that of methane, such as $H_2S$ and COS. These compounds of medium size can harm the process efficiency of the method according to the present invention and must therefore be removed from the feed to be processed.

Preprocessing consisting in dehydration can furthermore be carried out prior to the separation process of the present invention.

Natural gas can also contain $CO_2$. This compound does not harm the process efficiency of the method. It is separated with the compounds of type $G_2$ (with nitrogen) in first zone $A_1$, then with the compounds of type $G_1$ (with hydrocarbons) in second zone $A_2$. The method according to the invention is thus particularly interesting in the case where $CO_2$ must later be separated from the hydrocarbons since the compound is concentrated in stream $F_4$.

The two zones of the process according to the invention work according to a PSA type mode, with typical working cycles known to the man skilled in the art. For example, PSA type processes are described in Wagner's patent U.S. Pat. No. 3,430,418 or in Yang's more general book ("Gas separation by adsorption processes", Butterworth Publishers, US, 1987). PSA type processes are generally operated sequentially and by using alternately all the adsorption beds.

Such cycles can conventionally comprise for example compression stages, high-pressure production stages, possibly followed by cocurrent and/or countercurrent flushing, depressurizing, pressure equalizing. The number of adsorbers in each section is at least greater than one and generally ranges between one and ten, working in parallel in a PSA type mode.

The natural gas to be processed is fed into section $A_1$ through line 1.

The stream $F_1$ produced mainly comprises hydrocarbons or compounds having a kinetic diameter greater than or equal to that of methane, notably the hydrocarbons, not retained in the adsorbent in section $A_1$, at a pressure $P_1$ substantially close to pressure $P_0$. This value ranges for example between 0.3 and 3 MPa.

The stream $F_2$ resulting from a desorption operation in section $A_1$ is enriched in compounds $G_2$ in relation to the initial feed introduced. These compounds have a kinetic diameter less than or equal to that of nitrogen and can be, for example, nitrogen or compounds of low calorific value. Stream $F_2$ is produced at a pressure $P_2$ that is lower than pressure value $P_0$ and therefore lower than pressure value $P_1$. The value of $P_2$ ranges for example between 0.001 and 0.3 MPa.

Stream $F_2$ can still contain a large amount of hydrocarbons. This amount and therefore the hydrocarbon recovery ratio depend on the hydrocarbon content of the feed to be processed, on the working pressures of the first section of the process and on the conditions under which the various stages of the PSA cycle are canned out. The operating conditions of the first section are optimized so that the hydrocarbon recovery ratio has a maximum value, for example above 50% mol.

This stream $F_2$ is sent through line 3 to a compression device 6 in order to be brought to a pressure $P_3$ prior to being introduced into second adsorption section $A_2$. The value of $P_3$ ranges for example between 0.2 and 3 MPa.

A third stream $F_3$ at a pressure close to pressure $P_3$, comprising mainly compounds $G_2$, is obtained at the outlet of second adsorption section $A_2$ and discharged through line 4.

The implementation times of the compression and production sequences of the second section can be such that the stream $F_3$ produced at pressure $P_3$ contains a low proportion of hydrocarbons, for example of the order of 4% mol. This allows to limit hydrocarbon losses and to possibly discharge this stream into the atmosphere, according to specifications. In some cases, this specification can be more or less severe.

A fourth stream $F_4$ at a low pressure $P_4$, ranging for example between 0.001 and 0.3 MPa, resulting from a stage of desorption of this second section and mainly comprising compounds $G_1$, is discharged through line 5.

The operating conditions in this second section are such that stream $F_4$ produced at pressure $P_4$ has a calorific value close to the transportation network specifications, while remaining lower than that of stream $F_1$. This stream, which can contain up to 50% of the total amount of hydrocarbons processed with the method, can then be compressed to a pressure close to that of the feed to be processed and be added to stream $F_1$ directly produced by the first section. The stream thus obtained can then have a calorific value in accordance with the transportation and distribution network specifications.

According to a first embodiment of the invention, at least part of stream $F_3$ is used to flush first section $A_1$ and to produce a stream comprising compounds $G_1$.

Part of stream $F_3$ is therefore sent through a line 7 to a compression means such as a compressor 8 in order to raise the pressure value of $P_3$ to a pressure value substantially is close to $P_0$. The compressed fraction of stream $F_3$ is fed into section $A_1$ cocurrent to the adsorption stage through a line 9. In this section, this fraction is used to flush the adsorbers and to discharge part of the hydrocarbons contained in the dead volumes of the adsorbers of first section $A_1$. This stream of hydrocarbons (or more generally of compounds $G_1$) produced during cocurrent flushing of the adsorption stage is produced at high pressure and can therefore he added to stream $F_1$ mainly comprising hydrocarbons (or more generally compounds $G_1$) non adsorbed in the first section.

This procedure allows to improve the hydrocarbon (or more generally compounds $G_1$) recovery ratio per pass in this section $A_1$, up to values of 20% according to the hydrocarbon content of the feed to be processed, to the working pressures of the two process sections and to the conditions under which the various stages of the PSA cycles are carried out. The hydrocarbon content of the feed or of second stream $F_2$ sent to second section $A_2$ is thus decreased. Consequently, the recovery ratio per pass of nitrogen in section $A_2$ can also be improved up to values of 20% mol, which consequently decreases the amount of adsorbent to be used in this second section. Using at least a fraction of stream $F_3$ for flushing section $A_1$ thus allows, for the same stream purity specifications and global methane and nitrogen recovery ratios, to operate sections $A_1$ and $A_2$ with higher recovery ratios per pass respectively for compounds $G_1$ and compounds $G_2$, and therefore to reduce the number of sieves to be used in second section $A_2$. Furthermore, the relative volume of stream $F_1$ being greater because a fraction of stream $F_3$ has been used for flushing, the costs associated with compression of the gases are decreased. These various points underscore the coupling and the synergism existing between the two adsorption sections.

In order to increase the purity of stream $F_4$ in compounds $G_1$, at least a fraction of stream $F_4$ can be recycled to section $A_2$. The operating conditions, notably the amount of fraction recycled, allow to reduce the total amount of adsorbent to be used in the two adsorption zones or sections in relation to the case where these sections would lead to a purity in compounds $G_1$ for stream $F_4$ greater than or equal to that of stream $F_1$.

In a first realization example, a fraction of stream $F_4$ is sent through a line 5a running on from line 5 to line 3 upstream from compression device 6. This fraction is then mixed with stream $F_2$, at pressure $P_2$. The mixture is then fed into the second adsorption section in order to be processed according to the pattern described above.

In a second realization example of the invention, at least a fraction of stream $F_4$ is sent to a compression device 10 situated on a line 5b connected to the inlet of the second section, which is an extension of line 5. The fraction of this stream is brought to a pressure value $P_3$.

Without departing from the scope of the invention, stream $F_3$ can be partly or totally used for flushing countercurrent to the production stages during regeneration of the adsorbent (s). If part or all of stream $F_3$ is used for flushing section $A_1$, the stream is expanded to pressure $P_2$ beforehand. If this stream is used for flushing section $A_2$, it is expanded to pressure $P_4$ beforehand.

The same procedure applies for stream $F_1$.

In all the realization examples described above, the following conditions can be applied:

The feed or natural gas sent to the treating process is preferably at a temperature ranging between $-50°$ C. and $+100°$ C., and preferably between $-30°$ C. and $50°$ C. Its pressure $P_0$ ranges for example between 0.3 MPa and 3 MPa, preferably between 0.5 MPa and 2.5 MPa;

Pressure value $P_1$ ranges between 0.3 MPa and 3 MPa, preferably between 0.5 MPa and 2.5 MPa:

Pressure $P_2$ is below 0.5 MPa and preferably between 0.001 MPa and 0.5 MPa;

Pressure $P_3$ ranges between 0.2 MPa and 3 MPA, preferably between 0.3 MPA and 2 MPA; and Pressure $P_4$ is below 0.5 MPa and preferably between 0.001 MPa and 0.5 MPa.

Applied to processing of a natural gas containing hydrocarbons and nitrogen, the streams ($F_1$ and $F_4$) thus obtained have a calorific value in accordance with the network specifications. Furthermore, stream $F_1$ being produced at a pressure close to $P_1$ (between 0.3 and 3 MPa) the total compression costs associated with operations for placing the transportation and distribution networks intended for streams $F_1$ and $F_4$ under pressure are reduced in relation to the case where both streams $F_1$ and $F_4$ are at a pressure of type $P_4$ between 0.001 and 0.3 MPa. Furthermore, as a result of using at least a fraction of stream $F_3$ for flushing section $A_1$, the fraction of compounds $G_1$ produced in stream $F_1$ is greater than in the case where flushing is not performed, which directly leads to a decrease in the costs associated with compression of the gases.

The adsorbents that can be used in the two sections of the process can be natural or synthetic.

In the first separation section, they have pore sizes close to the kinetic diameters of the molecules to be separated, thus exhibiting a diffusion selectivity. More precisely, these pore sizes are to the order of 3.5 to 4.5 Å. The term effective pore diameter is conventional to the man skilled in the art. It is used to functionally define the size of a pore in terms of size of molecule capable of entering this pore. It does not refer to the real dimension of the pore, which is often difficult to determine because of its irregular (non-circular) shape. D. W. Breck discusses the effective pore diameter in his book entitled *Zeolite Molecular Sieves* (John Wiley and Sons, New York, 1974). pp. 633–641.

There are several adsorbent materials with a pore size of the order of 3.5 to 4.5 Å allowing to perform the type of diffusion selectivity separation carried out in the first section of the process. Examples thereof are carbon molecular sieves (U.S. Pat. Nos. 4,526,887: 5,238,888, 4,627,857 . . . ) and certain zeolite molecular sieves such as zeolites 4A and 5A, mordenite, natural or synthetic clinoptilolite, exchanged with calcium, magnesium, potassium, sodium or ammonium ions, chabazite and erionite. These sieves are known to the man skilled in the art and have been described in a book by D. M. Ruthven entitled *Principles of adsorption and adsorption processes* (John Wiley and Sons, New York, 1984).

The adsorbents that can be used in the second separation section are all those having a thermodynamic selectivity in favour of hydrocarbons rather than in favour of compounds whose kinetic diameter is less than that of nitrogen. These adsorbents are numerous. Examples thereof are carbon molecular sieves, activated charcoal, activated clays, silica gel, activated alumina, crystalline molecular sieves such as zeolites 5A, ZSM-5 (U.S. Pat. No. 3,702,886), ZSM-11 (U.S. Pat. No. RE 29,948), ZSM-48 (U.S. Pat. No. 3,709,979), ZSM-23 (U.S. Pat. No. 4,076,872), ferrierite (U.S. Pat. No. 4,016,425 and U.S. Pat. No. 4,251,499), faujasites and many other similar crystalline aluminosilicates. The adsorbents used in the first section can also be used in the second section since these adsorbents are selective towards hydrocarbons when used under conditions allowing to reach thermodynamic equilibrium.

EXAMPLE 1

Results Obtained with a Process Layout According to the Prior Art

The composition of the feed to be processed is given in Table 1:

TABLE 1 composition of the feed

| Compounds | Composition in % mol | Compounds | Composition in % mol |
|---|---|---|---|
| $C_1$ | 71 | $iC_5$ | 0.03 |
| $C_2$ | 1.8 | $nC_5$ | 0.01 |
| $C_3$ | 1.1 | $N_2$ | 25.26 |
| $iC_4$ | 0.3 | | |
| $nC_4$ | 0.5 | | |

This feed can also contain traces of $C_6$ and of benzene. Its temperature is 10° C. and its pressure is 1.8 MPa. The feed to be processed has a flow rate of 26,800 $Nm^3/d$.

The feed is sent to the first adsorption section A, of the process. In this example, the section consists of four adsorbers working sequentially according to a PSA cycle including compression, adsorption, cocurrent depressurizing, pressure equalizing, depressurizing and countercurrent flushing stages. The adsorbers are 2.6-m high cylinders, 1 m in inside diameter, containing each 1330 kg of carbon molecular sieve.

The adsorbent contained in the four adsorbers is regenerated by lowering the pressure to 0.12 MPa.

Under the operating conditions of the process, a first stream $F_1$ enriched in hydrocarbons is produced at a pressure of 1.8 MPa with the composition given in Table 2. The recovery ratio per pass of hydrocarbons is 60%. The hydrocarbon stream is produced with a mean flow rate of 12,260 $Nm^3/d$.

TABLE 2 first stream from the first section

| Compounds | Composition in % mol | Compounds | Composition in % mol |
|---|---|---|---|
| $C_1$ | 93.1 | $iC_5$ | 0.015 |
| $C_2$ | 2.36 | $nC_5$ | 0.015 |
| $C_3$ | 1.45 | $N_2$ | 2.0 |
| $iC_4$ | 0.4 | | |
| $nC_4$ | 0.65 | | |

The stages of regeneration of the adsorbent of the first adsorption section lead to the production of a second stream $F_2$ rich in compounds of low calorific value. Under the operating conditions of the process, this stream is produced at a pressure $P_2$ of 0.12 MPa with the composition given in Table 3. This stream is produced with a mean flow rate of 14,540 $Nm^3/d$.

TABLE 3 composition of the second stream $F_2$ obtained by regeneration of $A_1$

| Compounds | Composition in % mol | Compounds | Composition in % mol |
|---|---|---|---|
| $C_1$ | 52.5 | $iC_5$ | * |
| $C_2$ | 1.3 | $nC_5$ | * |
| $C_3$ | 0.8 | $N_2$ | 44.9 |
| $iC_4$ | 0.22 | | |
| $nC_4$ | 0.32 | | |

*too small to measure

This second stream $F_2$ is sent to a compressor in order to be brought to a pressure of 0.6 MPa. Stream $F_2$ thus obtained is then sent to second section $A_2$ of the process. This section consists of four adsorbers working sequentially according to a PSA cycle including compression, adsorption, cocurrent flushing, pressure equalizing, depressurizing and countercurrent flushing stages. About 70% mol of the stream produced during regeneration is recycled after compression to 0.6 MPa to adsorber $A_2$ during a cocurrent flushing stage following the production stage. The adsorbers are 2.5-m high cylinders, 1.1 m in inside diameter, containing each 1650 kg of activated charcoal.

The adsorbent contained in the four adsorbers is regenerated by lowering the pressure to 0.11 MPa.

Under the operating conditions of the process, stream $F_3$ enriched in nitrogen is produced at a pressure of 0.6 MPa with the composition given in Table 4 and a mean flow rate of 6590 $Nm^3/d$.

TABLE 4 composition of stream $F_3$ produced in second section $A_2$

| Compounds | Composition in % mol | Compounds | Composition in % mol |
|---|---|---|---|
| $C_1$ | 9.42 | $iC_5$ | * |
| $C_2$ | 0.3 | $nC_5$ | * |
| $C_3$ | 0.15 | $N_2$ | 90 |
| $iC_4$ | 0.05 | $CO_2$ | |
| $nC_4$ | 0.06 | | |

*too small to measure

The stages of regeneration of the adsorbent in second adsorption section $A_2$ lead to the production of a fourth stream $F_4$ enriched in hydrocarbons. Under the operating conditions of the process, this stream is produced at a pressure of 0.11 MPa with the composition given in Table 5. About 70% mol of this stream is recycled to section $A_2$. The net mean flow rate of the hydrocarbon-rich stream produced is 7950 $Nm^3/d$.

TABLE 5 composition of stream $F_4$ obtained by regeneration of section $A_2$

| Compounds | Composition in % mol | Compounds | Composition in % mol |
|---|---|---|---|
| $C_1$ | 88.2 | $iC_5$ | * |
| $C_2$ | 2.1 | $nC_5$ | * |
| $C_3$ | 1.2 | $N_2$ | 7.5 |
| $iC_4$ | 0.4 | | |
| $nC_4$ | 0.6 | | |

*too small to measure

Globally, the process according to the flowsheet of FIG. 1 leads to the production of:

an overall hydrocarbon recovery ratio of 96.7% for the whole process, an overall hydrocarbon stream ($F_1$ and $F_4$) containing 96% mol of hydrocarbons, with a calorific value in accordance with the network specifications, a nitrogen-rich stream (96%) in accordance with the European specifications on atmospheric discharges.

EXAMPLE 2

Process Layout Described in FIG. 2

Example 2 is different from example 1 in that part of the stream at a pressure of 0.6 MPa enriched in compounds of low calorific value coming from second section $A_2$ is compressed to 1.8 MPa and used for cocurrent flushing of the adsorbers of first section $A_1$ of the process after the adsorption stage. The feed to be processed and the adsorbers of first section $A_1$ are identical to those described in example 1.

Under these operating conditions, the recovery ratio per pass of hydrocarbons is 66%. The hydrocarbon stream is produced with a mean flow rate of 13,740 $Nm^3/d$, at a pressure of 1.8 MPa and with the same composition as that given in Table 2.

The adsorbent regeneration stages lead to the production of a stream at an intermediate pressure of 0.12 MPa, at the composition given in Table 6 and with a mean flow rate of 13790 MMSCFD.

TABLE 6 composition of stream $F_2$

| Compounds | Composition in % mol | Compounds | Composition in % mol |
|---|---|---|---|
| $C_1$ | 45.7 | $iC_5$ | * |
| $C_2$ | 1.1 | $nC_5$ | * |
| $C_3$ | 0.7 | $N_2$ | 51.9 |
| $iC_4$ | 0.2 | | |
| $nC_4$ | 0.4 | | |

*too small to measure

This stream $F_2$ is sent to a compressor in order to be brought to a pressure of 0.6 MPa. Stream $F_2$ thus obtained is sent to the second section of the process. This stream contains 7% less hydrocarbons than in the first example because of the cocurrent flushing carried out in the first section. This leads to a higher recovery ratio per pass of nitrogen in section $A_2$ (3% improvement) and allows to reduce by 11% the quantity of sieves used in the four adsorbers.

Under the operating conditions of the process, a nitrogen-enriched stream $F_3$ is produced at a pressure of 0.6 MPa with the same composition as that given in Table 4 to and with a mean flow rate of 6590 Nm$^3$/d.

The adsorbent regeneration stages lead to the production of a hydrocarbon-enriched stream $F_4$ whose composition is close to that given in Table 5. This stream is produced at a net mean flow rate of 6460 Nm$^3$/d.

Globally, the energy costs associated with compression of the gases by the process according to the invention are reduced by about 10%.

Globally, the flushing stage carried out by means of a fraction of stream $F_3$ cocurrent to the adsorption stage in the first section leads, with the same stream purity specifications and identical global methane and nitrogen recovery ratios, in relation to the first example, to:

- an improvement in the recovery ratio per pass of hydrocarbons in the first section of about 6% and in the recovery ratio per pass of nitrogen in the second section of 3%,
- a nearly 11% reduction in the amount of adsorbent used in the second section of the process, and
- a nearly 10% reduction in the energy consumption associated with compression of the gases.

The present invention applies in particular to processing of natural gases from production wells, comprising nitrogen contents ranging between 1% and 50% mol.

The range of application of this process notably concerns smaller entities. It can be used for capacities below 70 MMSCFD.

What is claimed is:

1. A method for processing a fluid comprising one or more compounds $G_2$ having a kinetic diameter less than or equal to that of nitrogen and one or more compounds $G_1$ having a kinetic diameter greater than or equal to that of methane, characterized in that it comprises in combination at least the following stages:

sending said fluid to an adsorption stage (a) after which a first stream $F_1$ enriched in compounds $G_1$ is obtained, said compounds $G_1$ being mostly adsorbed in a first adsorption zone $A_1$, carrying out a desorption stage (b) in said first adsorption zone $A_1$ at a pressure $P_2$ so as to produce a second stream $F_2$, said second stream $F_2$ being enriched in compounds $G_2$ in relation to said fluid to be processed, sending said second stream $F_2$ at a pressure $P_3$ to an adsorption stage (c), after which a third stream $F_3$ mainly comprising non-adsorbed compounds $G_2$ is obtained, and a second adsorption zone $A_2$ enriched in compounds $G_1$, carrying out a desorption stage (d) of said second adsorption zone $A_2$ at a pressure $P_4$ so as to recover at least a fourth stream $F_4$ mainly comprising compounds $G_1$, using at least a fraction of said third stream $F_3$ from said second adsorption zone $A_2$ at a pressure value substantially equal to $P_3$ and mainly comprising compounds $G_2$ for flushing said first adsorption zone $A_1$ in order to produce a stream comprising compounds $G_1$ after said adsorption stage (a).

2. A method as claimed in claim 1, characterized in that at least a fraction of said fourth stream $F_4$ is brought to a pressure substantially equal to $P_3$ and the compressed fraction is recycled to said adsorption stage (c).

3. A method as claimed in claim 1, characterized in that the various stages are carried out so as to obtain a purity in compounds $G_1$ of said fourth stream $F_4$ lower than the purity in compounds $G_1$ of said first stream $F_1$.

4. A method as claimed in claim 1, characterized in that at least a fraction of said third stream $F_3$ mainly comprising compounds $G_2$ non-adsorbed in said second adsorption zone $A_2$ is used to carry out cocurrent flushing of said first adsorption zone $A_1$ and to produce a stream comprising compounds $G_1$ after said adsorption stage (a), after bringing the pressure of said third stream $F_3$ to a pressure required for the flushing stage.

5. A method as claimed in claim 1, characterized in that the adsorption stage (a) is carried out at a pressure $P_1$ ranging between 0.3 and 3 MPa.

6. A method as claimed in claim 1, characterized in that the pressure value $P_2$ and/or the pressure value $P_4$ is below 0.5 MPa.

7. A method as claimed in claim 1, characterized in that the pressure value $P_3$ ranges between 0.2 and 3 MPa.

8. A method as claimed in claim 1, characterized in that the operating temperature ranges between −50 and +100° C.

9. A method as claimed in claim 1 characterized in said fluid comprising hydrocarbons.

10. A method as claimed in claim 1 characterized in that said fluid is natural gas.

11. A method as claimed in claim 1, characterized in that the adsorption stage (a) is carried out at a pressure $P_1$ ranging between 0.5 and 2.5 MPa.

12. A method as claimed in claim 1, characterized in that the pressure value $P_2$ and/or the pressure value $P_4$ is below 0.001 to 0.5 MPa.

13. A method as claimed in claim 1, characterized in that the pressure value $P_3$ ranges between 0.3 and 2 MPa.

14. A method as claimed in claim 1, characterized in that the operating temperature ranges between −30 and 50° C.

15. A plant for processing a fluid comprising at least compounds $G_1$ having a kinetic diameter greater than or equal to that of methane and compounds $G_2$ having a kinetic diameter less than or equal to that of nitrogen, comprising in combination at least a first adsorption means $A_1$ and a second adsorption means $A_2$ said first adsorption means $A_1$ being selected for its diffusion selectivity and its capacity to retain mostly compounds $G_2$, said second adsorption means $A_2$ being selected for its thermodynamic selectivity and its capacity to retain mostly compounds $G_1$, delivery and extraction lines for the various streams, said first adsorption means $A_1$ comprising at least a first line intended for delivery of the fluid to be processed, at least a second line intended for discharge of a first stream $F_1$ rich in compounds $G_1$, at least a third line allowing to extract a second stream $F_2$ enriched in compounds $G_2$ in relation to said fluid to be processed and to send said second stream $F_2$ to said second adsorption means $A_2$ comprising at least a fourth line intended for discharge of a third stream $F_3$ mainly comprising compounds $G_2$ and at least a fifth line intended for extraction of a stream $F_4$ mainly comprising compounds $G_1$, said plant being characterized in that it comprises at least injection means for injecting at least a fraction of said third stream $F_3$ comprising compounds $G_2$ into said first means $A_1$ so as to flush said first adsorption means $A_1$ and to produce a stream comprising compounds $G_1$, said injection means being provided with a device allowing said fraction of said third stream to be brought to a sufficient pressure.

16. A plant as claimed in claim 15, characterized in that said third line comprises means for bringing the pressure of said stream $F_2$ from a value $P_2$ to a pressure value $P_3$.

17. A plant as claimed in claim 15, characterized in that it comprises means (5, 5a; 5, 5b; 10) for recycling at least a fraction of said stream $F_4$ to the inlet of the second adsorption means.

* * * * *